United States Patent [19]

Mentink et al.

[11] Patent Number: 5,412,127

[45] Date of Patent: * May 2, 1995

[54] PROCESS FOR EXTRACTING MINOR FATTY COMPOUNDS FROM A SUBSTANCE OF BIOLOGICAL ORIGIN

[75] Inventors: Léon Mentink, Estaires; Michel Serpelloni, Beuvry-Les-Bethune, both of France

[73] Assignee: Roquette Freres, Lestrem, France

[ * ] Notice: The portion of the term of this patent subsequent to Dec. 6, 2011 has been disclaimed.

[21] Appl. No.: 854,662

[22] PCT Filed: Sep. 4, 1991

[86] PCT No.: PCT/FR91/00708

§ 371 Date: May 4, 1992

§ 102(e) Date: May 4, 1992

[87] PCT Pub. No.: WO92/04431

PCT Pub. Date: Mar. 19, 1992

[30] Foreign Application Priority Data

Sep. 4, 1990 [FR] France .................. 90 10969

[51] Int. Cl.6 ........................... C11B 3/02
[52] U.S. Cl. ................... 554/212; 554/175; 426/425; 426/426
[58] Field of Search ............ 554/199, 200, 175, 212; 426/425, 426

[56] References Cited

U.S. PATENT DOCUMENTS

3,491,132 1/1970 Reiners et al. .................. 260/420
4,880,573 7/1987 Courregelongue et al. ........ 554/199

FOREIGN PATENT DOCUMENTS

2844989 1/1989 Australia .
5125990 3/1990 Australia .
0174848 9/1985 European Pat. Off. .
0318326 11/1988 European Pat. Off. .

OTHER PUBLICATIONS

Abstract of JP 59 140 299 (Q.P. Corp).
Abstract of EP 0 278 794 (Monserbio).

*Primary Examiner*—José G. Dees
*Assistant Examiner*—Deborah D. Carr
*Attorney, Agent, or Firm*—Larson and Taylor

[57] ABSTRACT

A method for extracting minor fatty compounds, particularly steroids, from biological matter by means of cyclodextrin. According to the method, the cyclodextrin is stirred into said biological matter in a water-containing reaction medium to allow the formation of inclusion complexes between the cyclodextrin and the minor fatty compounds, whereafter said complexes are separated from said matter, the amount of water present in the reaction medium being lower than 100 % wt. in relation to the matter to be treated. The temperature of the reaction medium and the amount of water present therein are such that the cyclodextrin is partially undissolved.

20 Claims, No Drawings

PROCESS FOR EXTRACTING MINOR FATTY COMPOUNDS FROM A SUBSTANCE OF BIOLOGICAL ORIGIN

TECHNICAL FIELD

The present invention relates to a process for extracting minor fatty compounds, especially steroids, and more particularly cholesterol, which occur in a substance of biological origin.

BACKGROUND OF THE INVENTION

"Minor fatty compounds" designates all non-glyceride fatty constituents which occur in natural fatty substances. They may be steroids, especially sterols, fatty alcohols, fat-soluble vitamins, pigments, hydrocarbons, free fatty acids, abietic and pimaric acids, flavouring compounds and the like.

For more detail, reference can be made to the definition given in "Manuel d'analyse des corps gras (Manual of the analysis of fatty acids)" JP WOLF—Ed Azoulay—Paris 1969, pages 11 and 25.

Within the context of the present invention, the term "steroids" designates all compounds containing a more or less hydrogenated cyclopentanophenanthrene skeleton. Many of these compounds are alcohols and are termed sterols. They may occur in the form of esters especially of fatty acids, commonly designated by the term "cerides".

Cholesterol belongs to the sterol family. It has been known for some time that it is the main constituent of biliary calculi. Its reputation has recently been strengthened by its involvement in circulatory disorders, and more particularly the hardening of the arteries.

Nonesterified cholesterol is the main constituent of fatty substances of animal origin. These animal fats, which are present in most of our foodstuffs, constitute an important source of cholesterol which, in the event of an excess, may be the cause of serious cardiovascular diseases including myocardial infarction in particular.

Fatty substances of plant origin contain not cholesterol but phytosterols whose structure is very similar to it, such as for example: $\beta$-sitosterol, campesterol, stigmasterol, brassicasterol, $\Delta$-7-stigmasterol, $\Delta$-5-campesterol, $\Delta$-5-avenasterol, $\Delta$-7-avenasterol, $\Delta$-7-9-sigmatadienol, fucosterol or ergosterol.

The process according to the invention also applies to the oxidised derivatives of steroids: sterones. These compounds occur especially in frying oils used repeatedly. Their presence in food products is not desirable as they are not devoid of toxic effect.

In addition, steroids are products of high added-value both economically and technically. Indeed, they have the potential of constituting high grade raw materials for the preparation of vitamin compounds (ergosterol: vitamin D2) or hormonal compounds (equilenin, oestrone, progesterone, testosterone or cortisone and the like). In addition to their pharmaceutical applications, steroids, and more particularly sterols and their fatty acid esters (cerides), may be used in the cosmetics industry as emulsifiers.

As far as the other minor fatty compounds are concerned, there may be distinguished, on the one hand, compounds which are undesirable from the food or technological point of view such as free fatty acids which promote oxidation, degradation compounds such as polymerised acids, foul-smelling compounds, colouring substances and savoury substances and the like; and, on the other hand, compounds of high food or technological value such as fat-soluble vitamins, essential fatty acids (linoleic acid, $\alpha$-linoleic acid, $\gamma$-linoleic acid, arachidonic acid, DHA and EPA), rare fatty acids (ricinoleic and abietic acids), and flavouring compounds.

There are thus several justifications for all the technological developments designed to extract the minor fatty compounds from fatty biological substances. This term designates in particular, on the one hand, animal fats, what they are storage fats such as fish oils or animal oils (tallow, chicken fat, lard and the like), structural fats such as those present in muscular, placenteral or nerve tissue (meat, egg, spinal cord, brain and the like) or fats from glandular secretion such as milk fats, or fats from skin secretion such as cerides (lanolin); and, on the other hand, vegetable fats. Finally, the fats may be a mixture of animal fats and vegetable fats such as margarines.

DESCRIPTION OF THE RELATED ART

Various methods for extracting minor fatty compounds from fat-containing biological substances have thus already been proposed.

Primarily, techniques exist for extracting steroids, especially cholesterol.

One of them consists in placing fatty substance of animal origin in contact with digitonin (digitogenin glucodise), which has the property of reacting with cholesterol to give an insoluble precipitate. The efficiency and the results of this method are not satisfactory due to the difficulty of separating the precipitate from the mixture. And in any case, this method is inapplicable industrially, especially for food products.

Cholesterol may also be extracted from fatty substances by entrainment by means of a solvent. The main disadvantage of this process is that the solvents generally used are toxic and that traces of them always remain in the fatty substances considered.

Processes of microdistillation, which are inapplicable at the industrial level, or alternatively of absorption on columns such as those described for example in European Patent Applications No. 0,174,848 and No. 0,318,326, are also known. These applications describe a process according to which the fatty substance, maintained in a liquid state, passes through an absorption column, in this case activated charcoal. It is evident that such a process is very hard to implement and, furthermore, the extraction which is achieved by it is not very selective.

Another physicochemical process for extracting cholesterol from fats is disclosed by Japanese Patent Application No. 59/140,299. It consists in placing a substance charged with cholesterol, such as milk powder, in contact with supercritical $CO_2$ at a temperature of between 35° and 45° C. and at a pressure of between 130 and 200 atm. Obtaining these physical conditions requires the use of complex and expensive equipment. Control of the process is thus very intricate as a result. Furthermore, as specified in the patent application, other lipid compounds are entrained by the supercritical $CO_2$. This process is not therefore selective.

A process for the biodegradation of the said sterols, which is described by European Patent Application No. 0,278,794, has also been conceived for removing sterols from fats. This process uses bacteria which, when placed in contact with the fatty substance, are capable of metabolising the sterols contained therein. Like all processes involving fermentations, this biodegradation process is very intricate to manage because of the inherent variability of living matter. Furthermore, the equipment used and the relatively long duration are, inter alia, elements which make such a process expensive. Finally, the catabolites produced during these fermentations remain up until now completely unknown with respect to their nature and their toxicity and are, in any case, present in the fatty substance thus treated.

A process for removing the cholesterol present in a fatty substance of animal origin is also disclosed by European Patent Application No. 0,256,911. It is based on the property, known since 1958, which is exhibited by cyclodextrins (cyclic polyglucose compounds of tubular frustoconical conformation containing 6, 7 or 8 glucose units and respectively designated by alpha-, beta- or gamma-cyclodextrin) whereby they accept sterol molecules, and especially cholesterol molecules, into their hydrophobic cavity to form inclusion complexes which are soluble in water. According to this process, the fatty substance, which is maintained fluid, is placed in contact, in an aqueous medium, with a cyclodextrin, with stirring and under a nonoxidising atmosphere for 30 minutes to 10 hours so as to allow the formation of complexes. Separation of the latter is then carried out by entrainment with water which solubilises these complexes. The aqueous solution thus obtained is then collected after decantation. The lipid phase obtained must be washed with water several times so as to remove the traces of complexes. The conditions for carrying out this process turn out to be relatively exacting. One of the main constraints to be met is the maintenance of a nitrogen-based nonoxidising atmosphere over the entire period during which the compounds are placed in contact. This period is moreover very long in practice since, if reference is made to the examples, it can be observed that it is always greater than or equal to 3 hours.

The yield of cholesterol extraction by this process is not very high. Indeed, in the best case, it is only 41%, and this after three successive extractions as indicated in Example 3 of the description of this European patent application.

The amount of water required for the placing in contact before separation corresponds to not less than 1000% by weight relative to the fatty substance to be treated.

Still on the same principle of using cyclodextrins for the extraction of steroids, European Patent Application No. 0,326,469 describes a process for removing steroidal compounds present in a substance of biological origin. According to this process, the substance of biological origin, which is made fluid if it is a solid fat at normal temperature, is placed in contact with a cyclodextrin in aqueous medium. The contacting is carried out with stirring for 5 hours at a temperature of the order of 40° C. A separation of the cyclodextrin/steroid complexes is then carried out. Here again, it should be noted that the actual duration of the placing in contact, which is given in all the examples, is very long: minimum of 5 hours.

The low yields of sterol extraction given in the examples are evidence that this process lacks efficiency.

During the placing in contact before separation, the reaction medium contains more than 100% by weight of water relative to the substance to be treated expressed on a dry basis.

Secondly, processes for extracting minor fatty compounds other than steroids have been considered.

Among these processes, the one described in U.S. Pat. No. 3,491,132 and designed to reduce the free fatty acid content of glyceridic oils using cyclodextrin may be mentioned. In this case, the cyclodextrin is placed in contact with the fatty medium in the presence of substantial amounts of water ranging from 200 to 1000% relative to the fatty medium treated.

These last three processes, which are described in European Patent Applications Nos. 0,256,911 and 0,326,469 and in U.S. Pat. No. 3,491,132, have at least one major disadvantage in common, namely that they take place in aqueous medium and require very large amounts of water for the placing in contact.

It is evident that the use of such amounts of water constitutes a handicap from the industrial point of view since it makes it necessary to handle large reaction volumes and requires equipment of large capacity which is therefore bulky and more expensive. Moreover, in addition to the high direct cost which this entails, the treatment of the effluents obtained after the separation should also be taken into account; this treatment representing a burden which increases as a function of the amount of effluent.

In view of the foregoing, it should be noted that the techniques for extracting minor fatty compounds using cyclodextrin, which are the most satisfactory nevertheless, especially with respect to the quality of the products obtained, have not been optimised from the point of view of economic and technical profitability.

SUMMARY OF THE INVENTION

Anxious to promote technical development in this field, the applicant company carried out long and numerous studies at the end of which they succeeded, to their credit, in finding that it was preferable and advantageous to carry out the placing in contact with small amounts of water, in other words, not to provide for the solubilisation of all the cyclodextrin used for placing in contact, by choosing a suitable temperature and amount of water.

Accordingly, the present invention relates to a process for extracting minor fatty compounds, especially steroids, and more particularly cholesterol, which occur in a substance of biological origin, using cyclodextrin, in which the cyclodextrin is placed in contact, with stirring and in a reaction medium containing water., with the substance to be treated so as to allow the formation of inclusion complexes between the cyclodextrin and the minor fatty compounds, these complexes being subsequently separated from the said substance, characterised in that the amount of water is less than 100% by weight relative to the dry substance to be treated and in that, during the placing in contact, the temperature of the reaction medium and the amount of water present in the said medium are chosen so that the cyclodextrin is in a form which is partially undissolved.

DETAILED DESCRIPTION OF THE INVENTION

By adjusting these two parameters, which amounts to providing a cyclodextrin concentration in the reaction medium during the placing in contact which is above the maximum solubility of cyclodextrin at the reaction temperature, and by thus limiting the amounts of water used, all the costs of implementing the extraction process are substantially reduced while making the use more flexible and easier.

Furthermore, the extraction yields are improved for much shorter durations of placing in contact, and the amounts of effluents collected, and therefore to be retreated, are substantially reduced. These effluents are in concentrated form, which keeps down the costs of transportation and retreatment.

The arrangements according to the invention are particularly novel as they run counter to the teaching of prior extraction techniques using cyclodextrins, according to which it was envisaged to use water in sufficient amount to solubilise the bulk of the cyclodextrin. It was then assumed that the complexation could occur only if the cyclodextrin was in soluble form.

And it is surprising and unexpected to have established, in conformity with the present invention, that the complexation proceeds in an even more satisfactory manner from the point of view of the yields and the duration when the cyclodextrin is only partially solubilised, and therefore essentially in suspension in the water.

This is contrary to the teaching of European Patent Application No. 387,708, unpublished at the time of filing the present application, which relates to the extraction of cholesterol and fatty acids from an animal fat using cyclodextrin and which envisages that the latter must be completely in dissolved form during the placing in contact.

In practice, knowing the reaction temperature for the placing in contact, the appropriate cyclodextrin concentration is determined by taking care to choose it to be above the maximum solubility of cyclodextrin at this temperature.

For this, reference is made to the solubility constants of cyclodextrin in water, as a function of the temperature. The table below, which is taken from "Cyclodextrins and their inclusion complexes" (page 33) Akademiai Kiado, Budapest 1982—J. SZEJTLI, gives the maximum solubility values measured for beta-cyclodextrin.

| Grams of β-cyclodextrin in 100 ml of water | Temperature in degrees Celsius |
| --- | --- |
| 1.20 | 15 |
| 1.48 | 20 |
| 1.79 | 25 |
| 2.25 | 30 |
| 3.51 | 40 |
| 4.64 | 50 |
| 6.05 | 55 |
| 7.49 | 60 |
| 10.18 | 65 |
| 12.03 | 70 |
| 14.80 | 75 |
| 19.66 | 80 |

For a given reaction temperature, a "saturation level" of cyclodextrin in solution in water is defined which corresponds to the following ratio:

$$\frac{\text{Grams of cyclodextrin per 100 ml of water}}{\text{Maximum solubility value for cyclodextrin at the given temperature expressed in grams of cyclodextrin per 100 ml of water}}$$

In conformity with one of the essential features of the present invention, the saturation level of the cyclodextrin present in the reaction medium, during the placing in contact, is greater than or equal to 1.67, preferably greater than or equal to 1.87, and still more preferably greater than or equal to 2. A value less than 3000 is generally chosen, preferably less than 1500 and still more preferably less than 750.

In the examples of European Patent Application No. 0,387,708, the amount of water used is always not less than 100% by weight relative to the substance to be treated expressed on a dry basis, and the saturation level is always less than 1.55.

The process according to the invention may be applied to natural fatty substances which are essentially composed of triglycerides but low in total phospholipids: that is to say having a total phospholipid content of less than 10% by weight relative to the total lipids.

This process permits, in particular, the extraction of steroids such as cholesterol from numerous biological substances. They may be animal fats and/or vegetable fats among which there may be mentioned:

milk fats such as concentrated or nonconcentrated butter;

animal fats such as tallow, lard, horse fat, chicken fats, fish oils, lanolin;

vegetable fats such as hydrogenated vegetable fats, palm oil, copra oil, cacao butter;

and mixtures thereof such as margarines.

In addition to removing these compounds from foodstuffs, the process conforming to the invention offers a useful source of steroids which are capable of being used in the preparation of pharmaceutical ingredients, especially hormonal and vitamin ingredients, or in the cosmetics industry as emulsifiers.

The cyclodextrin used may be of the alpha, beta or gamma type, preferably of the beta type, which is substituted or unsubstituted. The mono- or poly-substituent groups of the cyclodextrin may be in particular alkyl groups such as the hydroxypropyl or ethyl group, or glycoside or maltosyl type saccharides and the like. Cyclodextrin rendered insoluble in water, for example by polymerisation, may also be chosen.

Advantageously, the cyclodextrin used in the process according to the invention is provided in pulverulent dried form. According to a specific embodiment, it has a water content of less than or equal to 11% by weight, preferably less than or equal to 7% by weight, and still more preferably less than or equal to 5% by weight. It is optionally rehydrated up to a water content of less than or equal to 15% by weight.

In conformity with an advantageous arrangement of the present invention, the amount of water present in the reaction medium, during the placing in contact and before separation, is preferably between 10 and 90%, and still more preferably between 20 and 80%, by weight relative to the substance to be treated expressed on a dry basis.

It is worthwhile to note that the placing in contact takes place under an ambient atmosphere. Indeed, the process conditions are not harsh and do not carry the risk of bringing about degradations, such as oxidation, of the sensitive fatty compounds (unsaturated fatty acids). Better still, cyclodextrin makes it possible, in addition, to remove, at least partially, the undesirable prooxidant compounds which may be present.

In conformity with a preferred embodiment of the invention, the placing in contact of cyclodextrin/substance to be treated is carried out at a temperature which is chosen such that the fatty substances present in the said substance are in a "congealed-state.

Congealed state, within the context of the present invention, is understood to mean a state in which the level of solid or crystalline fatty substances is greater than or equal to 5% by weight.

This solid fat level is a common variable in the field of lipid technology. It is measured by low resolution Nuclear Magnetic Resonance, using pulsed minispectrometers.

Pulsed NMR, which is based on the fact that fat molecules in the liquid phase have a degree of mobility which is greater than that of the molecules of the solid phase, enables the percentage of solid or liquid fat to be determined. The principle and the applications of this method are described for example in the journal R.I.B.C. of January–February, 1985, No. 80, pages 23 to 26, or in the journal I-A-A of May, 1988, pages 463 to 471 or of June, 1988, pages 463 to 470.

Contrary to what is recommended in the prior art and especially in European Patent Applications Nos. 0,256,911 and 0,326,469 and U.S. Pat. No. 3,491,132 which are mentioned above, the applicant company has demonstrated, surprisingly and unexpectedly, that the congealed state of the fatty substances which constitute the substance to be treated corresponds to an advantageous state for complexing-minor fatty compounds, especially steroids, with cyclodextrin at the stage of placing in contact with stirring.

Preferably, the operating conditions are chosen such that the level of solid fats is greater than or equal to 10%, and still more preferably greater than or equal to 30%.

In this preferred embodiment, the substance to be treated, water - if the said substance to be treated does not contain it or does not contain enough of it—and then cyclodextrin, preferably in pulverulent form, are placed together in a mixer equipped with kneading means. The sequence in which the products are introduced is preferably the one indicated above but it is also possible, among all the possible variants, to mix the substance to be treated and water beforehand.

Advantageously, the mixture is provided in a pasty form which is subjected, during the entire period of placing in contact, to a kneading operation during which the formation of cyclodextrin/minor fatty compound complexes occurs.

For the separation of these complexes, and this is one of the novelties of this preferred embodiment of the process according to the invention, the kneaded paste is heated to a temperature which is chosen such that the fatty substances constituting the substance to be treated are in a molten state, that is to say in a state characterised by a level of solid or crystalline fatty substances which is less than 1% by weight.

This conversion to the molten state makes it possible to obtain, on the one hand, a phase containing the fatty substances and with a reduced content of minor fatty compounds and, on the other hand, a mixed water-lipid phase containing the cyclodextrin/minor fatty compound inclusion complexes.

These two phases separate from each other very well and it is therefore easy to collect the fatty phase free of the minor fatty compounds, which may then be used in various applications. The mixed phase, for its part, may be retreated to extract therefrom the minor fatty compounds which may be upgraded, especially in the pharmaceutical or cosmetics field.

When the substance to be treated is an animal and/or vegetable fat with a high lipid content such as for example butter which is concentrated or unconcentrated, tallow, lard, chicken fats, lanolins, hydrogenated vegetable oils, palm or copra fats, margarines and the like, it is introduced into a dough type kneading device provided with means for regulating the temperature.

Water is then optionally incorporated therein insofar as the substance of biological origin to be treated does not contain it in a sufficient amount for the implementation of the process in conformity with the invention. The amount of water required is preferably between 20 and 60% by weight relative to the substance of biological origin to be treated, expressed on a dry basis.

Cyclodextrin is then added, preferably in pulverulent form and in sufficient amount for it to be partially in an undissolved form at the reaction temperature and to form inclusion complexes with the minor fatty compounds to be extracted.

The determination of the appropriate amount of cyclodextrin to be used is a function, on the one hand, of the maximum solubility of cyclodextrin at the temperature considered and, on the other hand, of the amount of minor fatty compounds to be extracted, and of their affinities for cyclodextrin. Generally, the amount of cyclodextrin is 0.5% to 15% relative to the substance of biological origin to be treated, expressed on a dry basis, preferably from 1 to 10% and more preferably from 3 to 8%.

The kneading of the paste formed by the mixing of these constituents is carried out at a temperature which is maintained constant by regulating means and chosen such that the fatty substance is in the congealed state with a level of solid or crystalline fats above 5%, preferably above 10% and more preferably between 30 and 50% by weight. For concentrated butter for example, the temperature is preferably chosen between about 10° and 25° C.

After a variable time, generally between 10 and 120 min, the kneading is stopped and the paste is heated sufficiently so that the level of solids in the fatty substance is less than 1% by weight. A water-lipid pellet containing the complexes and an oily liquid supernatant consisting of the fatty substance with a reduced minor fatty compound content are thereby formed.

As far as this preferred embodiment for the process according to the invention is concerned, it should be noted that this process can be perfectly integrated within the framework of the manufacture of butter from cream. This manufacture essentially comprises the following stages:

biological or physical maturation (NIZO process) of the cream;

continuous or batch churning with emulsion reversal and separation of buttermilk;

optional kneading with biological maturation (NIZO process);

optional washing with water.

In conformity with the invention, cyclodextrin may be added after separation of the buttermilk, during the kneading. At the end of a placing in contact which is carried out at the churning temperature (less than 15° C.), the separation of the inclusion complexes formed is carried out by reverting to the molten state.

According to another embodiment of the process according to the invention, the placing in contact of cyclodextrin with the substance to be treated is carried out at a temperature chosen such that the fatty substances constituting the said substance are in a noncongealed state.

In this embodiment of the process according to the invention, the substance to be treated, water and cyclodextrin, preferably introduced in this order, are mixed with stirring at a temperature chosen so that the fatty substances present are liquid (solids level less than 5% and preferably less than 1%).

The temperatures corresponding to a solids level of less than 1% are preferably less than 70° C. for most of the fatty substances. The determination of the minimum temperature for the placing in contact is wholly within the scope of a person skilled in the art. Obviously, it depends on the nature of the fatty substance considered.

The amount of water required is, preferably, between 45 and 80% by weight relative to the substance of biological origin to be treated expressed on a dry basis.

This embodiment is particularly suitable for the treatment of oils having a solids level of less than 1% at room temperature, such as sunflower, soya bean, colza and maize type vegetable oils and the like or such as fish oils.

The time of placing in contact ranges preferably between 10 and 120 min.

To separate the inclusion complexes formed, a centrifugation or a decantation of the mixture obtained is for example carried out after the placing in contact, so as to recover a pellet containing the said complexes, an aqueous intermediate phase and a supernatant lipid phase with a reduced minor fatty compound content.

The above two embodiments of the process according to the invention enable steroids and in particular sterols to be extracted with yields as high as about 90% in a single treatment. These yields may be improved by increasing the number of treatments. These extraction efficiencies are obtained economically and easily in a relatively short time.

Another advantage of the process conforming to the invention is that it can permit the selective extraction of a certain number of minor fatty compounds from a substance of biological origin, in a defined order, by controlling one or more essential process parameters, namely in particular the amount of water present at the time of the complexing stage, the amount of cyclodextrin, the mixing or kneading temperature, the temperature for the change of phase, the pH of the medium.

Naturally, the invention is not limited to the embodiments described above but, on the contrary, it encompasses all the variants thereof.

The following examples will make it possible to understand more clearly the process according to the present invention by demonstrating all the advantages offered by it.

EXAMPLE I

Extraction of Sterols, and More Particularly Cholesterol, which are Present in a Concentrated Butter in Conformity with the Preferred Embodiment of the Process According to the Invention The concentrated butter used has a concentration of fatty substances of the order of 99.9%. The standard concentrated butter marketed by CORMAN is chosen for example.

The cyclodextrin is a beta-cyclodextrin of the type marketed by the applicant company under the registered trade mark KLEPTOSE and provided in the form of a white powder containing about 12% moisture.

1. Placing in contact 300 g of concentrated butter are introduced into the container of a dough mixer of the type marketed by KUSTNER. The container of the mixer is provided with a double wall in which a temperature-regulating fluid may be circulated. The mixer is started and the temperature is maintained at a mean value of about 14° C. At this temperature, the concentrated butter has a level of solid fats of about 28%.

150 g of water and 5.70 g of KLEPTOSE cyclodextrin are then added successively. Knowing that the cyclodextrin used contains 12% water, the concentration of aqueous solution in the cyclodextrin is $$\frac{5.7 \times 0.88}{150.7} \times 100 = 3.3 \text{ g per 100 g of water.}$$

At the temperature for placing in contact (14° C.), the maximum solubility of the beta-cyclodextrin is 1.20 g per 100 g of solution. This amounts to saying that in our example the level of cyclodextrin saturation is 2.75.

The placing in contact then proceeds for 30 minutes.

2. Separation of the inclusion complexes

The pasty concentrated butter/water/cyclodextrin mixture removed from the mixer is heated to a temperature of the order of 37° C. (level of solid fats of the concentrated butter less than 1%). A change of phase occurs spontaneously and a pasty pellet is obtained containing in particular the inclusion complexes and water. This pellet is covered by an oily phase formed by the decholesterolised concentrated butter. More than 94% by weight of the concentrated butter used can then be recovered.

The cholesterol is assayed by a colorimetric method after oxidation to cholestenone using cholesterol oxidase, according to the method of, and using the reagents with the reference no. 139 050 from, BOEHRINGER Mannheim.

The initial cholesterol content of the concentrated butter is 0.270% by weight.

The final content is 0.038%.

The extraction yield therefore amounts to 86%.

A second extraction, carried out under the same conditions, provides a yield of 74%, which gives an overall yield of 96%.

It can be observed that the efficiency of the process according to the invention is quite remarkable both from the point of view of the amount and that of the duration.

The amount of water used is quite small and poses no problem of handling. The pasty pellet containing water which is used represents only 173 g. This small and concentrated amount poses no problem with respect to its retreatment.

EXAMPLE II

Extractions of Sterols and More Particularly Cholesterol, which are Present in Concentrated Butter in Conformity with the Preferred Embodiment of the Invention In this example, 9 tests for extracting cholesterols from concentrated butter were carried out using the same equipment and by following the same procedure as in Example I. Certain experimental parameters were simply changed. The data and results of these tests are presented in Table I below:

TABLE I

| Tests | Water % (1) | Water ml | Mean temperature in °C. | M.S.* | CD* kleptose (2) | CD* kleptose in g | Duration of placing in contact in minutes | Yield (3) | Level of saturation |
|---|---|---|---|---|---|---|---|---|---|
| 1 | 20 | 60 | 15 | 1.20 | 5 | 15 | 30 | 65 | 17.80 |
| 2 | 30 | 90 | 15 | 1.20 | 5 | 15 | 30 | 85 | 12.00 |
| 3 | 50 | 150 | 15 | 1.20 | 5 | 15 | 30 | 84 | 7.25 |
| 4 | 100 | 300 | 15 | 1.20 | 5 | 15 | 30 | 75 | 3.64 |
| 5 | 50 | 150 | 16 | 1.20 | 7 | 21 | 30 | 93 | 10.10 |
| 6 | 50 | 150 | 16 | 1.20 | 5 | 15 | 15 | 75 | 7.25 |
| 7 | 50 | 150 | 26.5 | 1.80 | 5 | 15 | 30 | 65 | 4.83 |
| 8 | 50 | 150 | 16 | 1.20 | 3 | 9 | 30 | 59 | 4.37 |
| 9 | 50 | 150 | 16 | 1.20 | 3 | 9 | 120 | 55 | 4.37 |

*M.S. = maximum solubility at given temperature
*CD = cyclodextrin
(1) % relative to concentrated butter
(2) % relative to concentrated butter
(3) Final cholesterol/initial cholesterol extraction yield (in %)

Comments on Table I

By comparing the results of tests 1 to 4 which differ only in the amount of water used, it can be observed that the cholesterol extraction yield, expressed in %, is maximum for water contents of between 30 and 50% relative to concentrated butter. The increase in the water content brings about a drop in the extraction yield.

By comparing the results of tests 3 and 5 for which only the KLEPTOSE cyclodextrin concentration is different (5 and 7% respectively relative to concentrated butter), it can be observed that it is possible to increase the extraction yield by 9% purely by increasing the cyclodextrin concentration by 2%.

In test 6, the duration of kneading was reduced to 15 minutes. The yield obtained is 75%, which constitutes a very satisfactory result.

For test 7, the temperature of placing in contact was increased to 26.6° C. By reducing the solids level in the concentrated butter, the cholesterol extraction yield is reduced (65% against 84% for test 3).

By using 3% cyclodextrin relative to concentrated butter (tests 8 and 9), it can be observed that beyond 30 min, prolonging the kneading does not enable the yields to be increased.

EXAMPLE III

Extraction of Sterols, and More Particularly Cholesterol, which are Present in Butter in Conformity with the Preferred Embodiment of the Process According to the Invention The butter used in this example is a commercial butter containing 82% of fatty substances.

The cyclodextrin, the equipment as well as the procedure are the same as for the preceding examples, the only difference being that no water is added; it is the butter itself which provides the water required for complex formation.

The data and results of this example are given in Table II below:

TABLE II

| | Water % (1) | Water g | Mean temperature in °C. | M.S.* | CD* kleptose (2) | CD* kleptose in g | Duration of placing in contact | Extraction yield in % | Level of saturation |
|---|---|---|---|---|---|---|---|---|---|
| Butter 150 g | 20.5 | 25.5 | 12.5 | 1.10 | 5 | 7.5 | 45 | 80 | 22.73 |

*M.S. = maximum solubility at given temperature
*CD = cyclodextrin
(1) % relative to concentrated butter
(2) % relative to concentrated butter It is shown here that the process according to the invention is also effective on a substance to be treated initially containing water in an amount conforming to the characteristics of the present invention.

EXAMPLE IV

Extraction of Sterols, and More Particularly Cholesterol, which are Present in Tallow, in Conformity with the Preferred Embodiment of the Process According to the Invention 200 g of tallow containing 99% of fatty substances, of the type marketed by ROUSSELOT, are treated in the same manner as in the preceding examples.

The initial cholesterol content of the tallow is 0.12% by weight.

Table III below shows the data and the results of the present example.

TABLE III

| | Water % (1) | Water g | Mean temperature in °C. | M.S.* | CD* kleptose (2) | CD* kleptose in g | Duration of placing in contact | Extraction yield in % | Level of saturation |
|---|---|---|---|---|---|---|---|---|---|
| Tallow | 50 | 100 | 16 | 1.20 | 3 | 6 | 30 | 83 | |

TABLE III-continued

| Water % (1) | g | Mean temperature in °C. | M.S.* | CD* kleptone (2) | in g | Duration of placing in contact | Extraction yield in % | Level of saturation |
| --- | --- | --- | --- | --- | --- | --- | --- | --- |
| 200 g | 25 | 50 | 16 | 1.20 | 3 | 6 | 60 | 82 | 4.36 |
| | | | | | | | 30 | 86 | |
| | | | | | | | 60 | 84 | 8.70 |

*M.S. = maximum solubility at given temperature
*CD = cyclodextrin
(1) % relative to concentrated butter
(2) % relative to concentrated butter Comments on Table III It appears that an amount of water of 25% by weight relative to the tallow is sufficient to extract 86% of the initial cholesterol, and this with only 3% by weight of cyclodextrin relative to the tallow.

An increase in the amount of water and/or the duration of placing in contact does not enable the extraction yield to be improved.

In this example, the variations in the acid values were also measured. The acid value is defined as the number of mg of potassium hydroxide required to neutralise the acidity of 1 g of tallow. The acid value of tallow before extraction is 0.85.

Table IV below presents the results obtained.

TABLE IV

| | Water (% relative to tallow) | Temperature °C | CD Kleptose (% relative to tallow) | Duration of placing in contact | Final acid value | % reduction in acid value |
| --- | --- | --- | --- | --- | --- | --- |
| Tallow | 50 | 26 | 3 | 30 | 0.65 | 30 |
| 200 g | 25 | 16 | 3 | 30 | 0.12 | 86 |

It is shown here that the decrease in acid value, and therefore of the free fatty acid content, of the tallow is very pronounced with 25% of water.

EXAMPLE V

Extraction of Sterols, and more Particularly Cholesterol, which are Present in a Fish Oil, in Conformity with the Preferred Embodiment of the Process According to the Invention The fish oil used is a salmon oil having a cholesterol content of 0.71%. In a first test, 300 g of this oil are mixed with 150 g of ice flakes and 30 g of KLEPTOSE cyclodextrin. The extraction treatment is then carried out as described in Example 1. The temperature of placing in contact is 4° C.

In a second test, 120 g of this oil are premixed with 180 g of hydrogenated copra oil for 20 minutes at 18° C. The mixture of fatty substances obtained is then subjected to the extraction process conforming to that described in the preceding examples using 15 g of KLEPTOSE cyclodextrin and 90 g of water.

The results and data for these two tests are collated in Table V.

TABLE V

| | Fish oils/fatty substances treated | % water/FS | % Kleptose CD/FS | % Kleptose CD/fish oil | M.S.* | Temperature in °C. | Time | Level of extraction in % | Level of saturation |
| --- | --- | --- | --- | --- | --- | --- | --- | --- | --- |
| Test 1 | 100% | 50 | 10 | 10 | 0.90 | 4 | 30 | 27 | 19.10 |
| Test 2 | 40% | 30 | 5 | 12.5 | 1.40 | 18 | 30 | 66 | 10.27 |

*M.S. = = maximum solubility at given temperature

By adjusting the level of solids by adding hydrogenated copra oil, the extraction yield of the cholesterol initially present in the salmon oil is improved.

EXAMPLE VI

Extraction of Fat-Soluble Pigments, Flavouring Compounds and Degradation Compounds which are Present in Frying Fat and in a Fish Oil, in Conformity with the Preferred Embodiment of the Process According to the Invention A vegetable fat for frying which is marketed by LESIEUR under the brand name VEGETALINE is used to carry out 12 fryings spaced out over time:
 2 fryings of breaded fish,
 3 fryings of sliced potatoes,
 3 fryings of whiting fillets,
 1 frying of pork back fat,
 3 fryings of meat croquettes.

This fatty substance is treated with and without KLEPTOSE β-cyclodextrin according to the procedure described in Example 1.

The odour and the colour of the products after treatment are evaluated qualitatively. The results are given in Table VI below.

The level of degradation of the fatty substances is assessed by using the OXIFRIT-TEST ® test marketed by MERCK.

A fish oil from which mucilages have been removed is treated in the same manner at low temperature. The odour and the colour of this oil, treated or untreated with β-cyclodextrin, are given in Table VI.

TABLE VI

| Nature (1) | Test | %/water/ mg | % β-cyclo-dextrin/ mg | M.S.* | Temp. (2) | Time (3) | Temp. (4) | Odour at 20° C. | Colour in the molten state | Result (5) | L.S.* |
|---|---|---|---|---|---|---|---|---|---|---|---|
| Vegetable F.S. after 12 fryings | 1 | 50 | 0 | — | 16 | 30 | 60 | Very strong frying odour | Chestnut-coloured | To be changed (dark green) | — |
| | 2 | 50 | 5 | 1.20 | 16 | 30 | 60 | faint odour | Cream coloured | Still good (emerald) | 7.24 |
| Unrefined fish oil from which mucilages have been removed | 3 | 30 | 0 | — | 3 | 30 | 60 | Rancid and pungent odour | Dark brown | — | — |
| | 4 | 30 | 5 | 0.90 | 3 | 30 | 60 | Odour of fresh fish | Yellow | — | 16.0 |

*M.S. = maximum solubility at given temperature
*L.S. = level of saturation
*F.S. = fatty substance
(1) Nature of the substance treated
(2) Treatment temperature in °C.
(3) Implementation time
(4) Separation temperature in °C.
(5) Result of the OXIFRIT ® test It can be observed that the two fatty substances treated with β-cyclodextrin in conformity with the invention exhibit better organoleptic properties.

As far as the frying fat is concerned, the treatment with β-cyclodextrin allowed removal of oxidised compounds (hydroperoxides, aldehydes, ketones, sterones and the like)

EXAMPLE VII

Extraction of Sterols, and More Particularly Cholesterol, which are Present in Concentrated Butter, in Conformity with the Second Embodiment of the Process According to the Invention In this example, the concentrated butter and cyclodextrin used are identical to those of Examples I and II.

1. Procedure 300 g of concentrated butter containing 0.27% cholesterol are introduced into a container equipped with stirring means and heated to a temperature of 50° C. 150 g of water and 15 g of KLEPTOSE cyclodextrin are then introduced therein. The placing in contact proceeds for 30 min with stirring and with the temperature being maintained at 50° C. The level of saturation is $$\frac{8.68}{4.64} = 1.87$$

2. Separation of the complexes

The concentrated butter/KLEPTOSE cyclodextrin/water mixture is subjected to a centrifugation at 3000 g for 5 minutes. The centrifugation enables the mixture to be separated into three phases:
- a pasty pellet containing the cyclodextrin/steroids inclusion complexes;
- an aqueous intermediate phase;
- and a supernatant phase with a reduced sterol content.

After washing the supernatant phase with an equal amount of water, a cholesterol extraction yield of 80% is determined.

It appears that the process conforming to the invention permits a substantial reduction in the sterol content with a limited amount of water.

EXAMPLE VIII

Extraction of Sterols, and More Particularly Cholesterol, which are Present in Concentrated Butter, in Conformity with the Second Embodiment of the Process According to the Invention In this example, 6 tests for extracting sterols from concentrated butter are carried out in the same manner as in Example VII. Certain experimental parameters were simply changed. The data and results of these tests are presented in Table VII below:

TABLE VII

| Tests | Water (1) | Temp. M (2) | Temp. S (2) | Kleptose CD % relative to the AMF* | M.S.* | Time (3) | Yield (4) | Level (5) |
|---|---|---|---|---|---|---|---|---|
| 1 | 50 | 50 | 50 | 1 | 4.64 | 30 | 26 | 0.38 |
| | " | " | " | 2 | " | " | 33 | 0.75 |
| | " | " | " | 5 | " | " | 80 | 1.87 |
| | " | " | " | 7 | " | " | 88 | 2.60 |
| 2 | 60 | 45 | 50 | 7 | 4.10 | 30 | 83 | 2.47 |
| | " | 55 | " | " | 6.05 | " | 80 | 1.67 |
| | " | 60 | " | " | 7.49 | " | 83 | 1.35 |
| | " | 65 | " | " | 10.8 | " | 71 | 0.94 |
| | " | 70 | " | " | 12.03 | " | 56 | 0.84 |
| 3 | 60 | 60 | 60 | 7 | 7.49 | 30 | 83 | 1.35 |
| | " | " | 75 | " | " | " | 73 | " |
| | " | " | 80 | " | " | " | 60 | " |
| | " | " | 90 | " | " | " | 37 | " |
| 4 | 20 | 50 | 50 | 5 | 4.64 | 30 | 44 | 4.60 |
| | 30 | " | " | " | " | " | 58 | 3.10 |
| | 40 | " | " | " | " | " | 63 | 2.33 |
| | 50 | " | " | " | " | " | 80 | 1.87 |
| | 85 | " | " | " | " | " | 70 | 1.11 |
| 5 | 60 | 50 | 50 | 5 | 4.64 | 2 | 38 | 1.56 |
| | " | " | " | " | " | 12 | 78 | " |
| | " | " | " | " | " | 30 | 80 | " |
| | " | " | " | " | " | 105 | 81 | " |
| | " | " | " | " | " | 180 | 80 | " |

TABLE VII-continued

| Tests | Water (1) | Temp. M (2) | S | Kleptose CD % relative to the AMF* | M.S.* | Time (3) | Yield (4) | Level (5) |
|---|---|---|---|---|---|---|---|---|
| | " | " | " | " | " | 285 | 79 | " |

*AMF = anhydrous milk fat
*M.S. = maximum solubility at given temperature
(1) in % relative to the AMF
(2) temperature in °C.
M = placing in contact — S = separation
(3) time of placing in contact in minutes
(4) extraction yield
in % $\frac{\text{final cholesterol}}{\text{initial cholesterol}}$
initial cholesterol
(5) level of saturation Comments on the Results In test 1, cyclodextrin concentrations of 1 to 7% by weight relative to the concentrated butter resulted in extraction yields of between 26 and 88%. The extraction yields are improved by increasing the level of saturation.

Test 2 shows that the higher the increase in the temperature of placing in contact and the greater the decrease in the saturation level, the greater the decrease of the corresponding extraction yields.

Test 3 shows that the same applies for the separation temperature. It seems preferable not to exceed 60° C.

The results of test 4 show that an amount of water equal to 50% enables a very satisfactory extraction yield of 80%, higher than that obtained with 100% water, to be achieved.

The extractions carried out with increasing periods of placing in contact, in test 5, show that from a time of the order of 12 minutes upwards, a plateau is practically reached which is equivalent to an extraction yield of about 80%.

EXAMPLE IX

Treatment of a Fatty Medium with Cyclodextrin

An amount of 50 kg of maize oil, whose phospholipids have been removed beforehand (removal of mucilages) and which has an acid value of 1.5 (expressed in % oleic acid per 100 g), is treated with 1.2 kg of β-cyclodextrin (marketed by the applicant company under the brand name KLEPTOSE) so as to extract the free fatty acids and the degradation compounds which are present in this oil.

The β-cyclodextrin, which is provided in powdered form, is dispersed in the oil to be treated by stirring. 20 kg of water are slowly added so as to form a crude emulsion by stirring and at room temperature (20° C., M.S.=1.48). The level of saturation is 3.54.

The whole mixture is then homogenised by stirring at 13,500 revolutions/minute for 1 minute using a UNIMIX type apparatus. A fine emulsion of the oil-in-water type with a texture similar to that of mayonnaise is thus obtained.

This emulsion is heated to 90° C. before being centrifuged at 6000 revolutions/minute for 5 minutes. Three phases are thus formed:
an oily phase which, after washing with water and drying, has an acid value of 0.6,
an aqueous phase,
a centrifugation pellet which is white in colour.

EXAMPLE X

Treatment of a Deodorisation Condensate using Cyclodextrin 1000 g of deodorisation condensate of a sunflower oil are treated with β-cyclodextrin (marketed under the registered trade mark KLEPTOSE by the applicant company) so as to extract the phytosterols which it contains. The composition of this coproduct which is derived from the refining of a sunflower oil is given in Table III below.

A double extraction is carried out on this condensate by proceeding as follows:
160 g of KLEPTOSE β-cyclodextrin and 160 g of water at 20° C. (M.S.=1.48) are added to the condensate. The level of saturation is 53. The mixture is homogenised for 5 minutes using an ULTRATURAX type equipment so as to produce a viscous and homogeneous emulsion. This emulsion is then diluted with 3000 g of water before being centrifuged at 3000 revolutions/minute and at room temperature. A first centrifugation pellet, a fatty phase and an intermediate aqueous phase are thus separated. The latter is removed. The other two phases are retained.
160 g of KLEPTOSE β-cyclodextrin and 160 g of water at 20° C. are added to the supernatant fatty phase obtained as described above so as to achieve a second extraction. The same procedure is followed in order to obtain a second centrifugation pellet and a fatty phase which has been subjected to a double extraction. This fatty phase is dried in an oven at 40° C. for 48 hours.

Its composition and that of the starting condensate are given in Table VIII below.

TABLE VIII

| | Composition of the deodorisation condensate used (%) | Composition of the supernatant fatty phase (%) |
|---|---|---|
| Total fatty substances including | 86.0 | 94.0 |
| free fatty acids and triglycerides | 82.0 | 82.5 |
| phytosterols (β sitosterol + stigmasterol) | 13.4 | 12.8 |
| tocopherols (α+ β) | 4.6 | 4.7 |
| β-cyclodextrin | — | |
| Others (water, glycerine, pigments) | 14.0 | 6.0 |

The β-cyclodextrin, through selective inclusion, permitted extraction of the phytosterols. The fatty phase treated is enriched with tocopherols, free fatty acids and triglycerides.

EXAMPLE XI

Production of an Enriched Aromatic Isolate using Cyclodextrin

A peppermint essential oil is treated with β-cyclodextrin (marketed by the applicant company under the brand name KLEPTOSE) so as to obtain a menthol-rich aromatic isolate.

For this, 110 g of KLEPTOSE β-cyclodextrin are mixed with 50 g of distilled water at room temperature (M.S.=1.48). The level of saturation is 103.5. A viscous white paste is thus obtained to which 200 g of essential oil are slowly added with mechanical stirring.

The mixture is then homogenised at 13,500 revolutions/minute using a UNIMIX type apparatus. A paste, in suspension in the oily medium, is thus obtained.

This paste is separated from the excess oil by filtration under vacuum using a Buchner type apparatus. A white aromatic powder is finally obtained. The said powder contains, on a dry basis, 12.6% aromatic isolate.

We claim:

1. A process for extracting minor fatty compounds selected from the group consisting of steroids, fatty alcohols, fat soluble vitamins, pigments, hydrocarbons and flavouring compounds from a substance of biological origin containing fatty substances, comprising the steps of:
    selecting a substance of biological origin containing said minor fatty compounds and fatty substances;
    selecting a cyclodextrin in pulverulent form capable of forming inclusion complexes with said minor fatty compounds, from the group consisting of substituted and unsubstituted alpha, beta and gamma cyclodextrin;
    providing an amount of said cyclodextrin of from 0.5 to 15% relative to the dry matter of the substance of biological origin to be treated;
    contacting the amount of cyclodextrin with the substance of biological origin in an aqueous reaction medium at a temperature about 10° C. to 25° C. and maintaining the water content of the reaction medium so as to obtain a saturation level of cyclodextrin in water equal to or greater than 1.67 at the reaction temperature and so that the cyclodextrin is in a partially undissolved form;
    mixing during 10 to 120 minutes the cyclodextrin with the substance of biological origin so as to obtain a pasty mixture and to allow the formation of the said inclusion complexes;
    separating, the said inclusion complexes formed during the contacting step from the said substance of biological origin by centrifugation, by decantation, or by heating the mixture obtained to a temperature at which not more than 1% of the fatty substances present in the substance of biological origin are in a solid or crystalline state; and
    recovering the substance of biological origin with a reduced content of minor fatty compounds.

2. The process according to claim 1, wherein the saturation level of cyclodextrin in water is between 1.87 and 750.

3. The process according to claim 1, wherein the saturation level of cyclodextrin in water is between 2 and 750.

4. The process according to claim 1, wherein the amount of cyclodextrin is 0.5 to 15% relative to the dry matter of the substance of biological origin to be treated.

5. The process according to claim 1, wherein the amount of cyclodextrin is 1 to 10% relative to the dry matter of the substance of biological origin to be treated.

6. The process according to claim 1, wherein the amount of cyclodextrin is 3 to 8% relative to the dry matter of the substance of biological origin to be treated.

7. The process according to claim 1, wherein the amount of water present in the reaction medium is between 20% and 80% par weight relative to the dry matter of the substance of biological origin to be treated.

8. The process according to claim 1, wherein the cyclodextrin is of the $\alpha$ type.

9. The process according to claim 1, wherein the cyclodextrin is of the $\beta$ type.

10. The process according to claim 1, wherein the temperature during the contacting step is the temperature at which at least 5% by weight of the fatty substances present in the substance of biological origin are in a solid or crystalline state.

11. The process according to claim 1, wherein the temperature during the contacting step is the temperature at which at least 10% by weight of the fatty susbstances present in the substance of biological origin are in a solid or crystalline state.

12. The process according to claim 1, wherein the temperature during the contacting step is the temperature at which from 30% to 50% by weight of the fatty substances present in the substance of biological origin are in a solid or crystalline state.

13. The process according to claim 1, wherein the mixture of substance of biological origin with water and with cyclodextrin is subjected, during the contacting step, to a kneading operation during which said complexes of cyclodextrin with minor fatty compounds are formed.

14. The process according to claim 1, wherein the separation of the complexes of cyclodextrin with minor fatty compounds is carried out by heating the reaction medium to a temperature at which at most 1% of the fatty substances present in the substance of biological origin are in a solid or crystalline state and by separating, on the one hand, the phase containing the fatty substances with a reduced content of minor fatty compounds and, on the other hand, the mixed water-lipid phase containing the complexes between the cyclodextrin and the minor fatty compounds.

15. The process according to claim 1, wherein the temperature during the separation step is less than or equal to 60° C.

16. The process according to claim 1, wherein the substance of biological origin is an animal fat or a vegetable fat having a total phospholipid level less than 10% by weight relative to the total lipids present in said substance of biological origin.

17. The process according to claim 1, wherein the substance of biological origin is selected in the group consisting of concentrated butter, butter, tallow, fish oils, frying fats, lanolins, deodorisation condensates and essential oils.

18. The process according to claim 17, wherein the substance of biological origin is concentrated butter.

19. The process according to claim 1 wherein the separation of the complexes of cyclodextrin with minor fatty compounds is carried out by centrifugation or by decantation so as to recover a pellet containing the said complexes, an aqueous intermediate phase and a supernatant lipid phase with a reduced minor fatty compounds content.

20. A method according to claim 1 further comprising the step of diluting said pasty mixture with water prior to separating the infusion complexes from the substances of biological origin.

* * * * *